Figure 4:
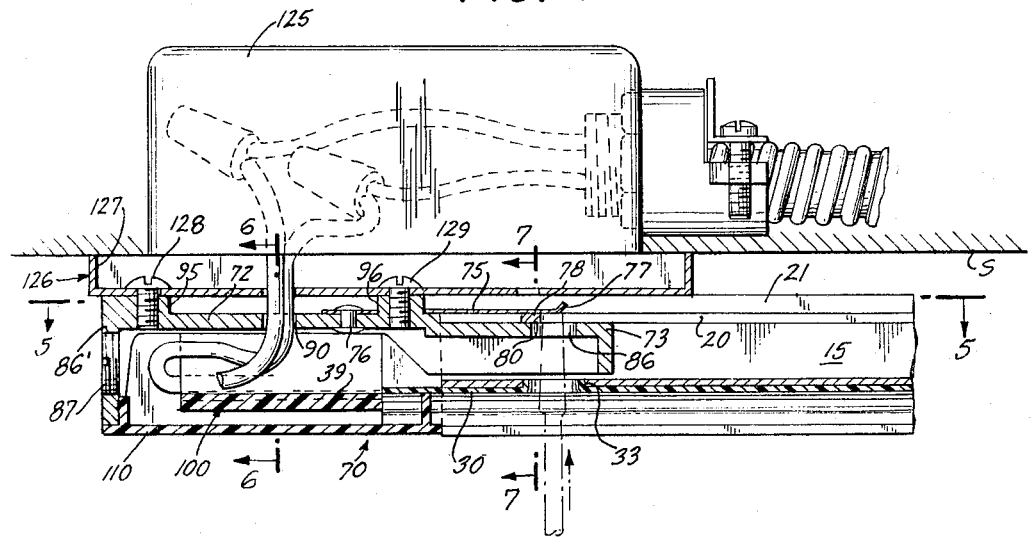

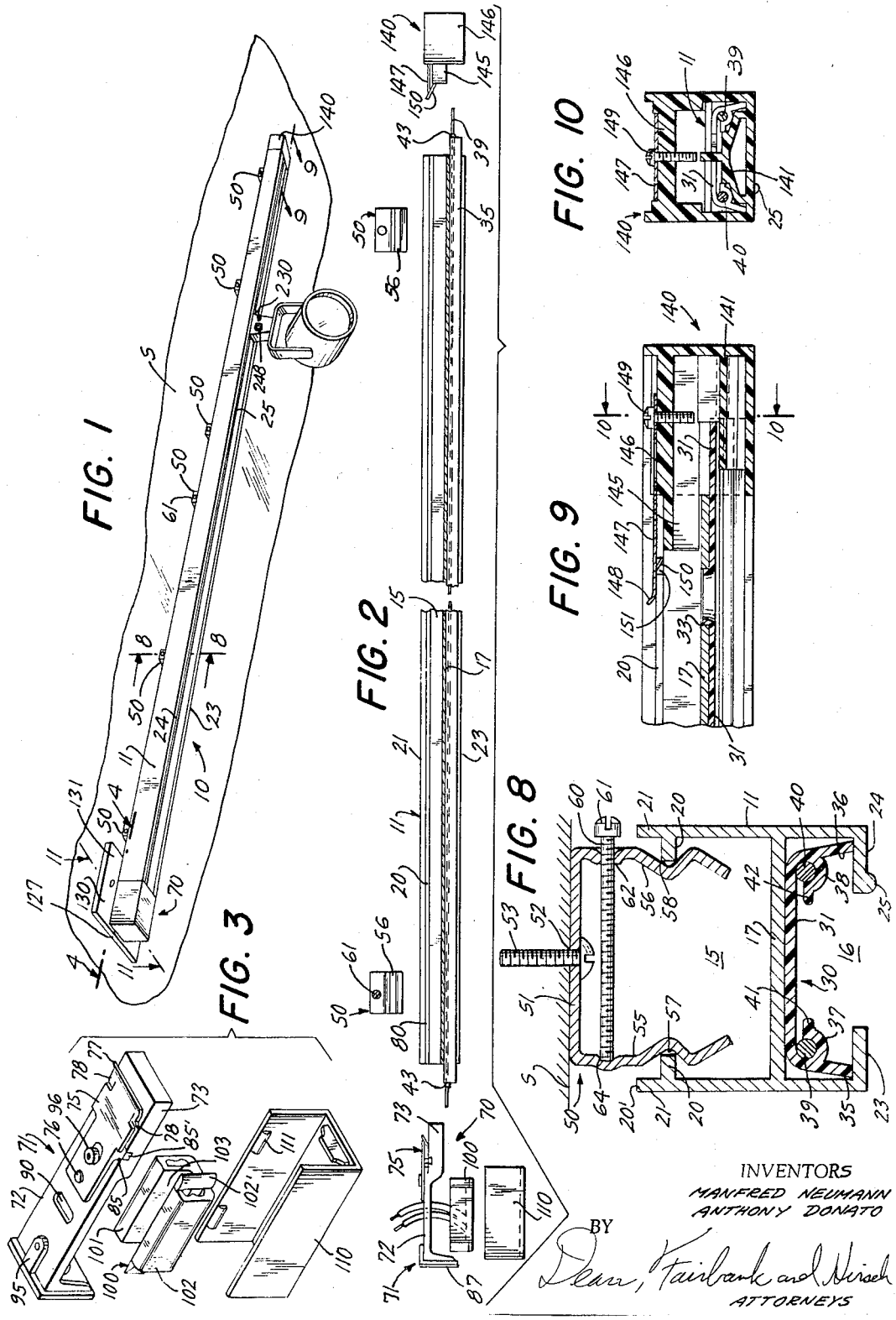

INVENTORS
MANFRED NEUMANN
ANTHONY DONATO

BY Dean, Fairbank and Hirsch
ATTORNEYS

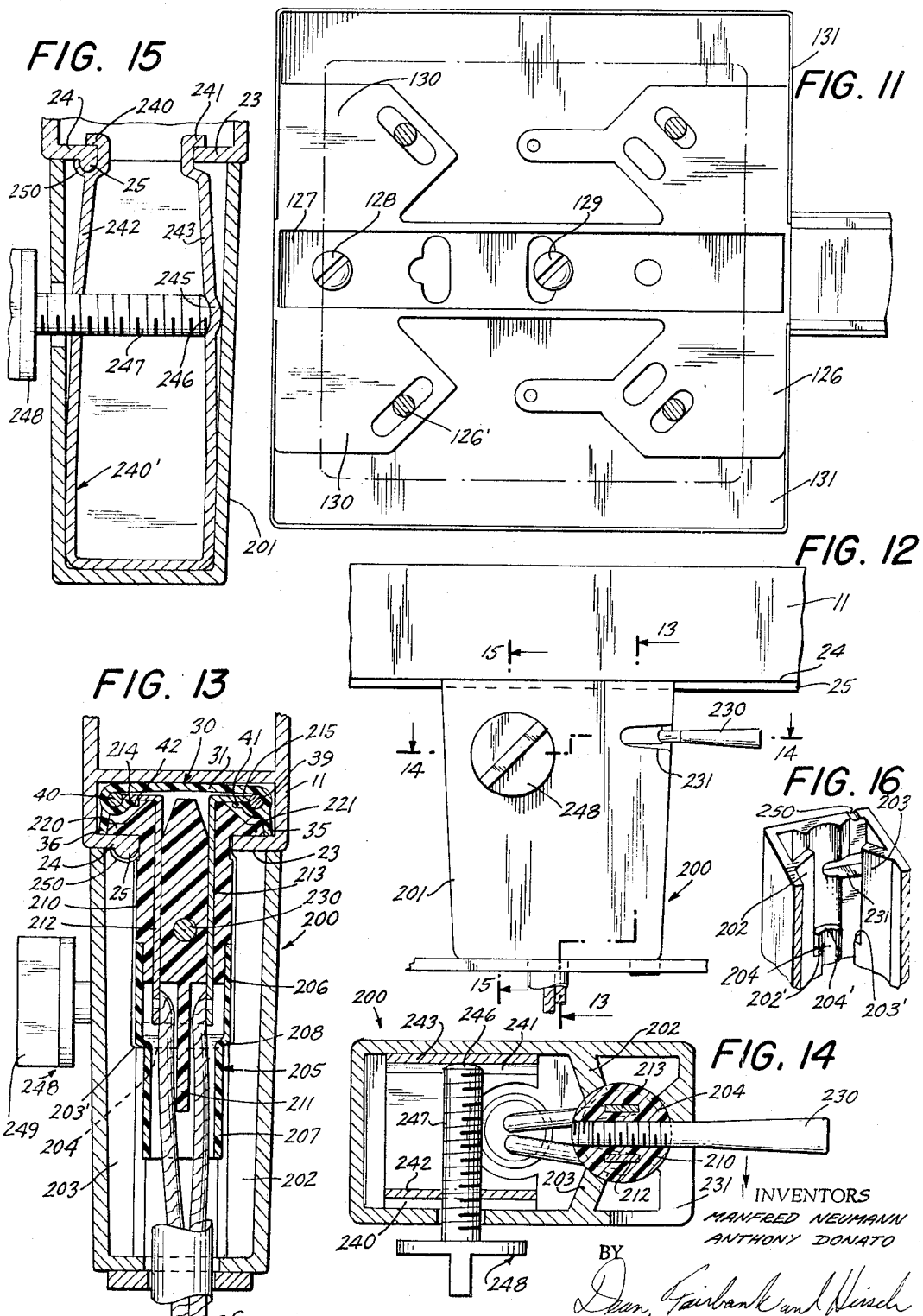

3,295,093
ELECTRIC POWER DISTRIBUTION CONDUIT ACCESSIBLE FOR CONNECTION THERETO ALONG SUBSTANTIALLY ITS ENTIRE LENGTH

Manfred Neumann, River Edge, and Anthony Donato, Woodridge, N.J., assignors to Lightolier Incorporated, New York, N.Y., a corporation of New York
Filed May 21, 1963, Ser. No. 282,538
5 Claims. (Cl. 339—21)

This invention relates to the art of electric power distribution, more particularly to an improved power distribution system which may be selectively installed in any desired area in which electric power is desired, and which serves to support and provide necessary power to any electrical equipment positioned in the area.

As conducive to an understanding of the invention, it is noted that with the increased use of electrical equipment, it is necessary to provide suitable means for connecting the equipment to the available power supply in the areas in which the equipment is being utilized. Conventional electrical receptacles positioned at a fixed location within any given area limit the range of movement of the equipment connected thereto unless long connecting wires are used which are likely to become entangled and may possibly be severed if used in a factory, for example, where movable vehicles are employed, with resultant safety hazard.

Furthermore, where it is desired to provide illumination of different areas of a room as by means of spot lights, unless an electrical receptacle is available adjacent the location where the illumination is desired, any excessive distance between the area to be illuminated and the source of light would detract from the effect of the spot light and also illuminate undesired areas.

It is accordingly among the objects of the invention to provide an improved electric power distribution system which may readily be mounted to provide a source of electric power adjacent any desired region of a room, which, in addition to providing such electric power will also support electrical equipment and permits selective connection of such equipment at substantially any portion, thereby eliminating the need for long connecting wires between the equipment and the power supply.

A further object of the invention is to provide an improved electric power distribution system which may be fabricated of components having a module length subject to being efficiently arranged in any desired combination in any given area.

According to the invention, these and other objects which will become hereafter apparent are achieved by forming an elongated track member having two opposed substantially U-shaped channels having a common partition or wall. One of these channels functions as the supporting channel for the assembly, while the other channel serves to carry the electric conductors and as a support for the equipment.

The supporting channel is formed with inturned flanges, which in the illustrative embodiment shown are adapted to be engaged by supporting clips which have been previously secured to the surface along which the track member is to be extended.

The conductor carrying and equipment support channel is also formed with inturned flanges which are at the free end of the legs thereof. Positioned in the channel is an elongated insulating strip formed with a base portion having spacer legs reacting against the flanges and acting to bias the base portion of the insulated strip against said partition wall. Electric conductor retaining sheaths extend inwardly from the spacer legs and retain the conductors at a spaced distance from each other and subject to access for electrical connection thereto.

In order to effect closure of the track to provide a desired smoothness of contour, and prevent inadvertent contact with the electric conductors thereof, a track closure end assembly is provided which is removably secured to the end of any length of track of the distribution system. When it is desired to couple any given length of track to another modular track length, a coupling connector may be employed to effect desired mechanical and electrical coupling and continuity. Coupling of the track to the power supply in the area may be effected by means of a track end mounting connector assembly serving the threefold function of permitting connection to the power supply, closing off the track end, and supporting the track end.

Among the features of the invention is the construction of the track of pre-selected modular lengths subject to ready arrangement in any given area, with modular track lengths subject to being interconnected to extend over a given desired length.

Another feature of the invention resides in the fact that the track components of the system are so formed that desired circuit polarity is always subject to being obtained.

A further feature of the invention is that the electrical conductors though subject to ready electrical connection by a suitable plug are not accessible to contact by inadvertent insertion of a screwdriver or other tool into the channel in which the conductors are positioned.

In the accompanying drawings in which is shown one of various possible embodiments of the several features of the invention, FIG. 1 is a perspective view of the power distribution system as utilized to support and energize a lighting fixture, FIG. 2 is an exploded view in elevation and partly in cross section, with parts broken away indicating the structural components of the power distribution system shown in FIG. 1, FIG. 3 is an exploded perspective view of a track end mounting connector assembly.

Figure 5:
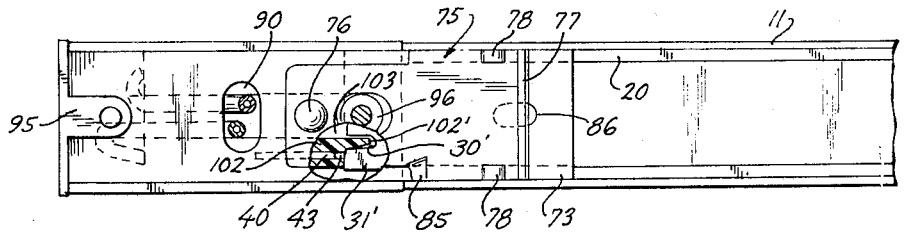
Figure 6:
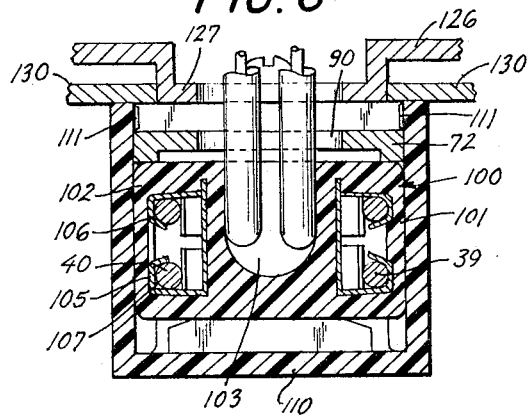
Figure 7:
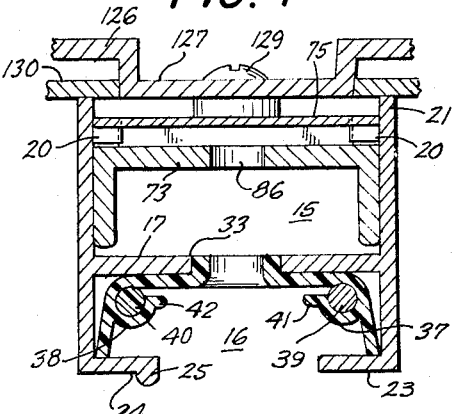

FIG. 4 is an enlarged cross sectional view taken on line 4—4 of FIG. 1 showing how the power distribution system is connected to a power source such as a conventional junction box, FIG. 5 is a cross sectional view taken on line 5—5 of FIG. 4 illustrating the details of the track end mounting connector assembly, FIG. 6 is an enlarged cross sectional view taken on line 6—6 of FIG. 4 illustrating the conductor connectors employed for effecting connection between the conductors of the power distribution strip, and the power supply, FIG. 7 is an enlarged cross sectional view taken on line 7—7 of FIG. 4 illustrating the interrelationship between the track end assembly and the power distribution track, FIG. 8 is an enlarged cross sectional view taken on line 8—8 of FIG. 1 illustrating the relationship between the support clip for the track and the track when arranged in operative position, FIG. 9 is an enlarged detail view taken on line 9—9 of FIG. 1 showing an end cap for closing off an end of the track, FIG. 10 is a cross sectional view taken on line 10—10 of FIG. 9, FIG. 11 is an enlarged detail view taken on line 11—11 of FIG. 1 illustrating the track and mounting support plate used in effecting a connection to the junction box of the power system, FIG. 12 is an enlarged side elevational view of a connector plug adapted for use between the power distribution track and the electrical equipment illustratively shown as a lighting fixture in FIG. 1, FIG. 13 is a cross sectional view on line 13—13 of FIG. 12 showing the details of the connector plug, FIG. 14 is a cross sectional view taken on line 14—14 of FIG. 12, FIG. 15 is a cross sectional view taken on line 15—15 of FIG. 12 showing the track flange engaging jaws of the connector plug, and FIG. 16 is a fragmentary perspective view of the interior of the connector plug.

Referring now to the drawings, in the illustrative embodiment of the invention, shown in FIGS. 1 and 2, the power distribution system 10 comprises an elongated track 11 preferably formed of extruded aluminum. It is preferred to form the track of basic four foot and eight foot modules, thereby facilitating its installation in conventional building structures.

Track 11, illustratively shown installed on a ceiling to provide overhead lighting, can of course be positioned on any desired wall surface. The description herein given will employ the terms "upper" and "lower" to designate the upper and lower portions of the track as used in the illustratively shown ceiling installation. As best seen in FIG. 8, the track 11 is formed with two opposed substantially U-shaped channels 15 and 16, spaced by a common partition or wall 17. The channel 15 is formed with inturned spaced flanges 20 positioned below the upper edges 20' of the legs of the channel so as to provide skirts 21 extending above flanges 20. The channel 16 is formed with inturned spaced flanges 23 and 24 at the free ends of the legs thereof. Flange 24 is provided with a ground locating bead 25 affording desired polarity of connection of the equipment to be powered and supported by the track.

Positioned in channel 16 is an elongated insulating strip 30 which is formed with a base 31 adapted to lie against and be secured to partition or wall 17 as illustrated in FIGS. 7, 8 and 9. Securement of the strip base 31 to wall 17 may be effected by thermally upsetting portions of base 31 into adjacent recesses 33 in wall 17 (FIG. 9). Spacer legs 35 and 36 are formed integral with the lateral edges of base 31 and dependent therefrom, with the free ends of said legs reacting against channel flanges 23 and 24 respectively, as best seen in FIG. 8, so as to bias the base 31 against wall 17. Curved conductor engaging flanges 37 and 38 formed integral with legs 35 and 36 define sheaths extending inwardly therefrom and surrounding conductors 39 and 40 respectively, conductor 40 illustratively being the ground side of the circuit in a two-wire system. Lips 41 and 42 extend inwardly from the inner edges of sheaths 37 and 38 and are slightly spaced from and extend parallel to base 31, so as to limit access to conductors 39 and 40 only along a plane parallel to the surface of base 31, whereby inadvertent contact with the conductors is prevented. The insulating strip 30 is preferably formed of an extruded rigid material such as a suitable thermo-setting plastic such as "melamine" or the like. In order to prevent longitudinal shifting of the conductors 39 and 40 in sheaths 37, 38, protuberances 43 formed by clips are arranged at the exposed ends of the conductors 39 and 40 as seen to the right and left in FIG. 2.

Mounting of the track 11 with respect to any desired surface is effected by means of supporting spring clips 50, as best seen in FIGS. 1, 2 and 8. Clips 50 are formed with a base portion 51, having a central aperture 52 adapted to accommodate a fastening member 53 such as a screw, bolt, or rivet or the like, serving to anchor the clip 50 with respect to a supporting surface S. It will be noted that clip base 51 is adapted to lie flush against supporting surface S. Extending from base 51 are legs 55 and 56, each formed respectively with an indent 57 and 58 within which flanges 20 of supporting channel 15 of track 11 may be engaged. A screw 60 having a slotted head 61, passes in threaded engagement through a tapped aperture 62 in each of the legs 56, while the free end of screw 60 contacts bearing seat 64 on leg 55, so that upon turning of screw 60 so that it moves towards leg 55, legs 55 and 56 are separated to insure secure engagement of the flages 20 on track 11.

In order to effect a connection between the conductors 39 and 40 of the power distribution track 11 with the available power supply, a track end mounting connector assembly 70 is employed, as shown to the left in FIGS. 1 and 2 and illustrated in greater detail in FIGS. 3, 4, 5 and 6. End mounting connector assembly 70 comprises a track end closure component 71 having a body portion 72 formed with a nose portion 73, with the top surface of the nose portion 73 as viewed to the left in FIG. 2 and FIG. 4 lying in a plane displaced from the plane of the top surface of body portion 72. The distance between the top of body portion 72 and the top of nose portion 73 is substantially equal to the thickness of flange 20 so that when as shown in FIG. 4, nose portion 73 is slid beneath flange 20 into channel 15, the top surface of flange 20 will lie flush with the top surface of body portion 72. In order releasably to lock the connector assembly 70 to the end of track 11, a locking plate 75 formed of spring steel or the like is riveted at 76 to body portion 72 (see FIG. 3). Thus, plate 75 is cantilevered from rivet 76 to extend out over nose portion 73 to sandwich flanges 20 between the plate 75 and the top surface of nose portion 73. An upwardly bent entry lip 77 is formed on the free end of plate 75 to implement sliding of the flange 20 axially under plate 75. Retaining teeth 78 are upset on opposite edges of plate 75 to engage in notches 80 formed in flanges 20 at a distance from the end of track 11, equal to the distance between the end of teeth 78 and body portion 72, thus insuring the positioning of the nose portion 73 entirely within channel 15, as shown in FIG. 4.

A camming tooth 85 (see FIGS. 3 and 5) is formed on one edge of plate 75, positioned in a notch 85' in nose 73 for engagement by the leading edge of flange 20 as it is inserted between the pressure plate and the top of nose 73 so as to insure the biasing of the plate downwardly against the flange 20 and also insures positive electrical ground continuity.

A slot 86 is formed in nose portion 73 beneath plate 75 and aligned with opening 33 so as to permit the insertion therethrough of a tip of a screwdriver or the like, as shown in phatom in FIG. 4, to force the plate 75 upwardly away from nose portion 73 to release teeth 78 from engagement with notches 80 in the flanges 20 when it is desired to effect removal of the track end closure component 71 from below.

A tapped aperture 86' (to the left in FIG. 4) is formed at the end of body portion 72, remote from nose portion 73, which may be utilized to permit the insertion of conductors for connection to the power distribution strip. However, in the illustrated embodiment of the invention this aperture 86' is shown as closed by means of threaded plug 87. Body portion 72 is formed with a conductor aperture 90, as illustrated in FIG. 4 through which the conductor leads necessary to effect connection to the power distribution strip may be extended. Threaded bushings 95 and 96 are formed integrally with body portion 72 and of height equal to the distance between the top of flange 20 and the top of skirt 21 as shown in FIG. 4.

Within body portion 72 a connector block 100 is arranged, as best shown in FIGS. 2, 3 and 6. Connector block 100 is also formed of a suitable insulating theremosetting plastic material and is contoured to be encompassed by closure component 71. Connector block 100, as best shown in FIGS. 3 and 6, is formed with two spaced lobes 101 and 102, with a channel 103 formed therebetween. To insure uniformity of ground continuity, the ends of lobes 102 are provided with fingers 102' one of which as shown in FIG. 5, adjacent the end 31' of base 31 extending beyond channel 16 meshing with a corresponding notch 30' in such end 31' adjacent conductor 40.

Within each of lobes 101 and 102, a connector clip 105 is arranged. Connector clips 105 are formed of a conducting material such as copper or the like and each is provided with an upper conductor engaging channel 106 intended to receive a conductor from the power supply, and a lower channel 107 which engages conductors 39 and 40 respectively. Each of the channels 106 and 107 are formed with engaging teeth extending into the path of the conductor in the channel so as to grip the conductor. These teeth may be made self-locking, or releasable with respect to the conductor as desired. It is preferred, however, that the connection between the connector block 100 and the conductors 39, 40 of the power distribution track 11 be made detachable so as to implement removal of the track when desired. A cover housing 110 also preferably of plastic, is snapped in position over connector block 100 and the body portion 72, and to this end is provided with detents 111 which snap over the top of body 72 to insure engagement of the cover member in desired operative position, as best shown in FIG. 6.

In order to effect securement of the track end mounting assembly to the junction box 125, a mounting plate 126 is provided, as best shown in FIG. 11. Mounting plate 126 is formed with a channel 127 at the center thereof between its wings 130. Channel 127 is secured with respect to end closure component 71 by means of screws 128 and 129 extending into tapped bushings 95 and 96 as best shown in FIG. 4. The wings 130 of mounting plate 126 are secured to the attachment plate of the conventional junction box 125 in usual fashion as understood by those skilled in the art. As best seen in FIGS. 1 and 11, finishing cover plates 131 are provided to extend between the ends of channel 127 and the extremities of the junction box so as to provide access to the junction box for splicing.

Closure of the end of power distribution track 11 remote from its power connection end, is accomplished by means of track end closure assembly 140, as seen to the right in FIG. 1, and in FIGS. 9 and 10. Track end closure assembly 140 is of a block-like configuration having a cross sectional dimension susbtantially like that of the exterior of the track so that when the enclosure assembly is in position with respect to the track, a desired smoothness of contour will be obtained. End closure assembly 140 preferably is molded of a thermo-setting plastic material. This assembly is molded with an interior transverse spacer 141 adapted to be positioned beneath the base 31 of strip 30, as shown in FIG. 10. A nose portion 145 extends from the body portion 146 of assembly 140, and has a thickness just slightly less than the distance between wall 17 and flanges 20. A resilient locking plate 147 formed with entry nose 148 is secured by means of screw 149 to extend in cantilevered fashion over nose portion 145. As previously described in connection with connector assembly and closure component 71, the plate 147 serves to sandwich flanges 20 between the plate and the top surface of nose portion 145. Latching teeth 150 are preferably provided in plate 147 for engagement with slots 151 in flanges 20, so that upon sliding of the end assembly 140 into position into the end of track 11, secure engagement will be effected between the end assembly 140 and the track. In the event that it is desired to effect release of the end assembly from the track in situations where extension of the track or other changes are in order, an elongated member such as a screwdriver tip or the like may be extended through slots 33 into proximity with the end of plate 147 to force same to a position releasing teeth 150 from engagement with slots 151.

Connector plug 200, as best shown in FIGS. 12 and 13 may be utilized to effect a connection between electrical equipment and the power distribution track 11. Connector plug 200, which is here shown by way of illustration as typical of the type of connector which may be utilized with the track 11, is more fully described in copending application Serial No. 288,420.

Connector plug 200 is formed with an external box-like housing, rectangular in cross section as illustrated in FIG. 14, and slightly tapered in elevation, as shown in FIGS. 12, 13 and 15. Housing 201 is preferably die-cast of a suitable alloy and is formed with interior ribs 202, 203 and 204 as shown in FIG. 13. Positioned for rotation on seats 202', 203' and 204' formed in the ribs, is a sleeve member 205 having an upper portion 206 of relatively larger diameter than the lower portion 207 and defining an annular shoulder 208 which rests on said seats.

Sleeve 205 accommodates a plug body 210 which is of a cylindrical configuration and is formed of insulating material. A separator strip 211 formed integral with the plug body extends axially from one end thereof, a pair of conducting strips 212, 213 extending through the plug body 210 on opposite sides respectively of the separator strip 211. Contact fingers 214 and 215 are formed respectively at the upper ends of strips 212 and 213, and the distances between the ends of fingers 214 and 215 are substantially equal to the distance between the conductors 39 and 40 as measured from their facing surfaces, as best shown in FIG. 13. Locking flanges 220 and 221 extend laterally from the other end of the plug body 210 a distance substantially equal to the distance between the facing surface of spacer legs 35 and 36 of strip 30. Conducting strips 212 and 213 are adapted for connection to leads from an electrical supply cord C.

A handle 230 extends through slot 231 in housing 201 into threaded engagement with plug body 210, as best shown in FIG. 14. Slot 231 extends from a side surface to the front surface of housing 201, as viewed in FIGS. 12 and 14, thus permitting rotation of plug body member 210 through 90 degrees.

Mechanical coupling of the connector plug housing 201 to the track 11 is effected by means of jaws 240, 241 on the upper end of the legs 242 and 243 respectively of a U-shaped locking member 240'. A bearing indent 245 on leg 243 is contacted by the nose 246 of screw 247 extending through a threaded opening in leg 242, said screw being formed with knob 248 arranged externally of housing 201, as best shown in FIGS. 12 and 15.

In order to effect a polarized connection between connection plug housing 201 and track 11, housing 201 is formed wtih a notch 250 as best seen in FIGS. 13, 15 and 16 to insure proper indexing and orientation of the connector plug 200 with respect to track 11.

In use of the aforedescribed power distribution system, it will be understood that supporting clips 50, as best shown in FIG. 8, are arranged at spaced intervals on a line along which it is desired to extend the power distribution track 11. After securement of clips 50 in position with respect to the surface upon which the track is to be mounted, by utilization of conventional fastening members such as screws, rivets or the like, dependent on the character of the surface to which the clips are to be secured, the connector assembly 70 is arranged with respect to the junction box in the area, as illustrated in FIG. 4. The closure component 71 is secured to mounting plate 126 by screws 128, 129, as best shown in FIGS. 4 and 11. Mounting plate 126 is then fastened to the conventional attachment plate of the conventional junction box by screws 126'. Thereafter, the free ends of suitable wires are extended into the upper channels 106 of connector block 100 as illustrated in FIGS. 4 and 6 and the other ends of the wires are extended through aperture 90 of closure component 71 into the junction box and a suitable splice is made to the power lines. Cover housing 110 is then snapped in position over the connector block 100.

The track supporting channel 15 is then forced upwardly into engagement with clips 50, with flanges 20, as best shown in FIG. 8, arranged in engagement with indents 57, 58 of clips 50. Before tightening screws 60, the track is shifted along its axis until the nose portion 73 of end component 71, as best shown in FIG. 4, enters the track supporting channel 15. As a result, the free ends of conductors 39 and 40 within sheaths 37, 38 will be forced into the lower conductor engaging channels 107 of the connector clips 105 in connector block 100 as best shown in FIG. 6.

When the track section 11 is forced as far as possible over nose portion 73 until its contacts body portion 72, the teeth 78 of the resilient plate 75 will engage the slots 80 in the flanges 20 to effect securement of the track with respect to the end connector assembly. At this time, screws 60 of supporting clips 50 are tightened to separate legs 55, 56 thus locking the track 11 in a secure position.

The other end of the track 11 may be coupled to a similar length of track by the utilization of a connector block 100 arranged within an appropriate housing. Where the track closure assembly 140 is employed, the nose portion 145 is inserted within track supporting channel 15, with plate 147 overlying the flanges 20 so as to grip the same by engaging slots 151 in the flanges 20.

Positioning of the connector plug 200 with respect to the track is effected by arranging the housing 201 in proximity to flanges 23 and 24 of the track with polarity notch 250 receiving track bead 25 to insure desired polarity of connection, it being understood that the ground side of plug 210 is adapted for connection to the ground side of the track by virtue of this alignment of bead 25 with notch 250. Jaws 240 and 241 of connector plug 200 are slid between the opposed faces of track flanges 23 and 24. Thereafter, by turning knob 248, legs 242 and 243 are separated causing jaws 240 and 241 to grip the flanges 24 and 23 respectively. At this point contact fingers 214 and 215 of the conducting strips 212 and 213 respectively are connected to the conductors 40 and 39 respectively by rotating handle 230 through 90 degrees. Disconnection is effected by rotating the handle 230 to its originally described position.

It is thus seen that a simple and effective power distribution system has been provided which may be installed in any given area to provide an electrical connection and mechanical support for any equipment within the area with maximum flexibility and economy.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. An electric power distribution track comprising an elongated rigid member having a track supporting channel and conductor carrying channel integral therewith, a common partition between the channels, said conductor carrying channel being substantially U-shaped and having a pair of opposed parallel legs, a flange extending inwardly from each of said legs, an elongated insulating strip within said conductor carrying channel and extending the length thereof, said strip being substantially U-shaped in cross section and having a base with a pair of spaced side walls each having an inwardly extending lip portion adjacent the base and spaced therefrom to define a sheath, a pair of spaced parallel conductors extending the length of said strip and positioned respectively adjacent each lateral edge of the base in an associated sheath, said sheaths substantially encompassing and maintaining said electrical conductors in spaced insulated relationship, said inwardly extending lips on said sheaths extending in a plane parallel to the base and extending inwardly beyond the periphery of the associated conductor thereby preventing access to the conductors other than along a plane parallel to said base, said side walls of said strip defining spacer legs extending from the lateral edges of the base thereof into contact with said flange and reacting thereagainst to urge said base against said common partition.

2. The combination set forth in claim 1 in which said track supporting channel is also substantially U-shaped having a pair of opposed parallel legs and a flange extending inwardly from each of said legs, said lips of said strip each having an arcuate portion defining a sheath and a flange extending inwardly beyond the arcuate portion.

3. An electric power distribution track as in claim 1, in which said partition between said channels is formed with a recess, and the base of said strip is upset into said recess to prevent shifting of said strip in said conductor carrying channel.

4. An electric power distribution track comprising an elongated rigid member having a track supporting channel and conductor carrying channel integral therewith, a common partition between the channels, said track supporting channel being substantially U-shaped and having a pair of opposed parallel legs, a flange extending inwardly from each of said legs, said track supporting channel having an open end, a removable closure member provided for said open end, said closure member having a nose portion adapted for insertion into said track supporting channel beneath said flange and resilient means carried by said closure member, said resilient means comprising a pressure plate overlying the flanges and coacting with the top surfaces of the latter to sandwich said flanges between the nose portion and said pressure plate, releasably to lock said closure member in position, an elongated insulating strip within said conductor carrying channel and extending the length thereof, said strip being substantially U-shaped in cross section and having a base with a pair of spaced side walls each having an inwardly extending lip portion adjacent the base and spaced therefrom to define a sheath, a pair of spaced parallel conductors extending the length of said strip and positioned respectively adjacent each lateral edge of the base in an associated sheath, said sheaths substantially encompassing and maintaining said electrical conductors in spaced insulated relationship, and said inwardly extending lips on said sheaths extending in a plane parallel to the base and extending inwardly beyond the periphery of the associated conductor thereby preventing access to the conductors other than along a plane parallel to said base.

5. An electric power distribution track as in claim 4 in which said pressure plate is formed with a latching tooth and at least one of said flanges has a slot engaged by said tooth, thereby to lock the end closure in position.

References Cited by the Examiner

UNITED STATES PATENTS

| 1,742,850 | 1/1930 | Douglas | 339—24 |
|---|---|---|---|
| 2,039,957 | 5/1936 | Hall | 200—166 |
| 2,170,300 | 8/1939 | Frank | 339—21 |
| 2,384,487 | 9/1945 | O'Brien | 339—22 |
| 2,743,423 | 4/1956 | Parks | 339—21 |
| 2,924,804 | 2/1960 | Frank et al. | 339—21 |
| 2,968,690 | 1/1961 | Higgins | 339—24 |
| 2,977,566 | 3/1961 | Neumann et al. | 339—20 |

ROBERT K. SCHAEFER, *Primary Examiner.*

BERNARD A. GILHEANY, KATHLEEN H. CLAFFY, E. JAMES SAX, *Examiners.*

D. SMITH, JR., *Assistant Examiner.*